(12) United States Patent
Mosher et al.

(10) Patent No.: US 10,690,240 B2
(45) Date of Patent: Jun. 23, 2020

(54) REAL-TIME TRACKING AND FILTERING OF ESTIMATED DRIVELINE RATIOS

(71) Applicant: PACCAR Inc, Bellevue, WA (US)

(72) Inventors: Jordan Mosher, Woodinville, WA (US); Christopher Balton, Bellingham, WA (US); Christopher Douglas, Mount Vernon, WA (US)

(73) Assignee: PACCAR INC, Bellevue, WA (US)

( * ) Notice: Subject to any disclaimer, the term of this patent is extended or adjusted under 35 U.S.C. 154(b) by 225 days.

(21) Appl. No.: 15/851,263

(22) Filed: Dec. 21, 2017

(65) Prior Publication Data

US 2019/0195351 A1 Jun. 27, 2019

(51) Int. Cl.
*F16H 61/02* (2006.01)
*B60W 40/12* (2012.01)
(Continued)

(52) U.S. Cl.
CPC ......... *F16H 61/0213* (2013.01); *B60W 40/12* (2013.01); *B60W 50/045* (2013.01); *B60W 30/14* (2013.01); *B60W 2050/0018* (2013.01); *B60W 2050/0026* (2013.01); *B60W 2050/0075* (2013.01); *B60W 2050/0088* (2013.01); *B60W 2510/0208* (2013.01); *B60W 2510/0638* (2013.01); *B60W 2510/1005* (2013.01); *B60W 2520/10* (2013.01); *B60W 2710/1005* (2013.01);
(Continued)

(58) Field of Classification Search
CPC ........... F16H 61/0213; F16H 2061/009; F16H 2061/0096; F16H 2061/0218; F16H 2061/022; F16H 61/02
See application file for complete search history.

(56) References Cited

U.S. PATENT DOCUMENTS 4,361,060 A * 11/1982 Smyth .................. B60W 10/02
477/120
4,732,055 A * 3/1988 Tateno .................... F16H 59/54
477/73
(Continued)

FOREIGN PATENT DOCUMENTS

| DE | 19506296 C1 | 4/1996 |
| EP | 0 110 857 A1 | 6/1984 |
| EP | 3 028 913 A1 | 6/2016 |

OTHER PUBLICATIONS

Extended European Search Report dated Apr. 25, 2019, issued in corresponding European Application No. EP 18215720.6, filed Dec. 21, 2018, 9 pages.

*Primary Examiner* — Huan Le

(57) ABSTRACT

A computer system (e.g., an on-board vehicle computer system) creates or updates a mapping of transmission gears and respective driveline ratios during operation of the vehicle. The system obtains a current engine speed and vehicle speed and calculates a current driveline ratio for the vehicle based on the current engine speed and vehicle speed. If the driveline is engaged, the system updates the mapping based at least in part on the current driveline ratio. Performing the update may include adding a new transmission gear or updating an existing transmission gear in the mapping, or removing a duplicate transmission gear from the mapping. Applications include cruise control, predictive cruise control, predictive shifting, and selecting a gear for a specific purpose (e.g., for descending a hill).

21 Claims, 12 Drawing Sheets

(51) Int. Cl.
  *B60W 50/04* (2006.01)
  *F16H 59/70* (2006.01)
  *B60W 50/00* (2006.01)
  *B60W 30/14* (2006.01)
  *F16H 61/00* (2006.01)

(52) U.S. Cl.
  CPC .. *F16H 2059/706* (2013.01); *F16H 2061/009* (2013.01); *F16H 2061/0096* (2013.01); *F16H 2061/022* (2013.01); *F16H 2061/0218* (2013.01)

(56) References Cited

U.S. PATENT DOCUMENTS

| | | | |
|---|---|---|---|
| 5,016,175 A * | 5/1991 | Baltusis | F16H 3/66 192/3.29 |
| 5,948,033 A | 9/1999 | Baer | |
| 2012/0209482 A1 * | 8/2012 | Busdiecker | F16H 61/0213 701/54 |

* cited by examiner

```
function Ratios = GearMemorization(CurrentRatio, PreviousTopRatios, Margin, FilterTimeConstant, dT)
% Gear memory/filter over time.
%%
%Initalize
Ratios = single(zeros(numel(PreviousTopRatios),1));
PreviousTopRatios_Index = uint8(1);
PreviousLowerMargin = single(100);
%Calculate Low pass filter coefficient.
if (FilterTimeConstant >= dT)
LPF_Coefficient = dT / FilterTimeConstant;
else LPF_Coefficient = single(1);
end
for NewTopRatios_Index = 1:numel(PreviousTopRatios)
    %Define Upper and lower margins for each stored gear.
    UpperMargin = PreviousTopRatios(PreviousTopRatios_Index) + Margin*PreviousTopRatios(PreviousTopRatios_Index);
    LowerMargin = PreviousTopRatios(PreviousTopRatios_Index) - Margin*PreviousTopRatios(PreviousTopRatios_Index);
    %If below the previous lower margin and above the current upper
    %margin, insert the new gear above the current gear.
    if ((CurrentRatio < PreviousLowerMargin)&&(CurrentRatio > UpperMargin))
        Ratios(NewTopRatios_Index) = CurrentRatio;
        PreviousLowerMargin = CurrentRatio - Margin*CurrentRatio;
```

*FIG. 5A*

```
%Filter If between the current lower and upper margins, add sample to this gear
elseif ((CurrentRatio >= LowerMargin)&&(CurrentRatio <= UpperMargin))
    Ratios(NewTopRatios_Index) = (PreviousTopRatios(PreviousTopRatios_Index)*(1-
LPF_Coefficient)) + (CurrentRatio * LPF_Coefficient);
    PreviousTopRatios_Index = PreviousTopRatios_Index +1;
    PreviousLowerMargin = LowerMargin;
%If Not above or within this range move on to next gear.
else
    Ratios(NewTopRatios_Index) = PreviousTopRatios(PreviousTopRatios_Index);
    PreviousTopRatios_Index = PreviousTopRatios_Index +1;
    PreviousLowerMargin = LowerMargin;
end
end
%Clean out Duplicates
PreviousRatio = single(0);
CleanTopRatios_Index = uint8(1);
CleanTopRatios = single(zeros(numel(PreviousTopRatios),1));
for NewTopRatios_Index = 1:numel(PreviousTopRatios)
    if (abs(Ratios(NewTopRatios_Index)-
PreviousRatio)>(Margin*Ratios(NewTopRatios_Index)))
        CleanTopRatios(CleanTopRatios_Index) = Ratios(NewTopRatios_Index);
        CleanTopRatios_Index = CleanTopRatios_Index+1;
    end
    PreviousRatio = Ratios(NewTopRatios_Index);
end
%Replace the New Top Ratios with the New Clean Top Ratios.
Ratios = CleanTopRatios;
end
```

*FIG. 5B*

REAL-TIME TRACKING AND FILTERING OF ESTIMATED DRIVELINE RATIOS

BACKGROUND

Modern vehicles are increasingly available in a variety of configurations. This flexibility offers a wide range of potential benefits. For example, transmissions, axle ratios and other features can be selected to optimize the truck for a desired measure of performance, such as top-end speed, power, or fuel economy. However, the availability of many transmission ratios and axle ratios at manufacturing time, as well as the possibility of subsequent changes to the transmission or axle ratio, makes keeping track of the total driveline ratios associated with various transmission gears quite difficult. Without the ability to reliably calibrate mappings between transmission gears and corresponding driveline ratios, any truck features that require such mappings can become inaccurate or even unusable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a computer system (e.g., an on-board vehicle computer system comprising one or more processing units) obtains a current engine speed for a vehicle; obtains a current vehicle speed for the vehicle; calculates a current driveline ratio for the vehicle based on the current engine speed and the current vehicle speed; determines whether a driveline of the vehicle is engaged; and, if the driveline of the vehicle is engaged, performs an update of a mapping of transmission gears and respective driveline ratios for the vehicle based at least in part on the current driveline ratio.

Performing the update may include obtaining one or more stored driveline ratios from the driveline ratio data store; and comparing the current driveline ratio with the one or more stored driveline ratios. The comparing may include determining that the current driveline ratio is not within error bounds of any of the one or more stored driveline ratios. The comparing also may include determining that the current driveline ratio is within error bounds of at least one of the stored driveline ratios associated with at least one existing transmission gear in the mapping. Performing the update may further include, based on the comparing, adding a new transmission gear to the mapping or updating an existing transmission gear in the mapping. Adding the new transmission gear may include adding the current driveline ratio to the mapping for the new transmission gear. Updating the existing transmission gear may include adding the current driveline ratio as a new sample for the at least one existing transmission gear in the mapping. Performing the update may further include removing a duplicate transmission gear from the mapping or merging two or more existing transmission gears in the mapping.

The computer system may use the mapping for many purposes. For example, the computer system may use the updated mapping in a cruise control system or a predictive cruise control system, for predictive shifting, or to select a gear for a specific purpose (e.g., for descending a hill).

The system may be implemented in a vehicle having a powertrain comprising an engine connected to a transmission (e.g., an automatic transmission, an automated manual transmission, or a manual transmission) having a number of gears; at least one processing unit; and one or more computer-readable media having stored therein a driveline ratio data store for the vehicle and computer-executable instructions. The driveline ratio data store comprises a mapping of the transmission gears and respective driveline ratios for the vehicle. The computer-executable instructions are configured to cause the at least one processing unit to perform functions such as those described above.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A and 5B depict illustrative details in computer code of a driveline ratio analysis (or gear memorization) function that may be implemented in a driveline ratio analysis system in accordance with aspects of the present disclosure;

DETAILED DESCRIPTION

Figure 1:
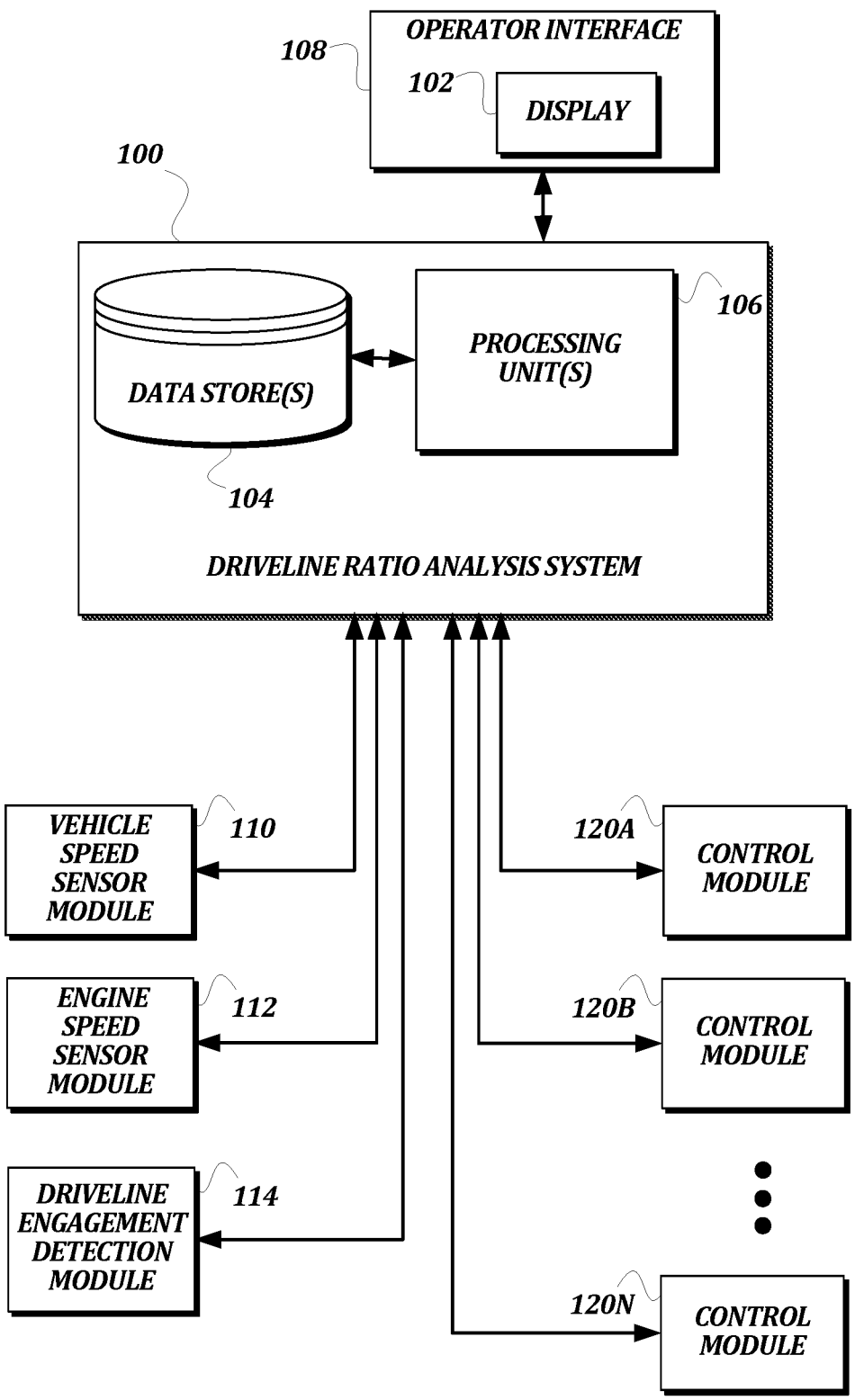
FIG. 1 is a block diagram that illustrates an embodiment of a vehicle computer system including a driveline ratio analysis system according to various aspects of the present disclosure.

The detailed description set forth below in connection with the appended drawings is an illustrative and non-limiting description of various embodiments of the disclosed subject matter. The following description proceeds with reference to examples of systems and methods suitable for use in or with vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

In described embodiments, a driveline ratio analysis system tracks and stores estimated driveline ratios in real time. Methods and systems described herein may be used to improve features that rely on an accurate mapping of driveline ratios to available gears in a vehicle transmission (e.g., an automatic transmission, an automated manual transmission, or a manual transmission). The availability of many transmission ratios and axle ratios at manufacturing time, as well as the possibility of subsequent changes to the transmission or axle ratio, makes calibration of these mappings a difficult task. Described embodiments make this task easier by allowing real-time calculation and storage of estimated driveline ratios, and updates of related mappings to transmission gears. These calculations and updates can be performed while the vehicle is operating, in a manner that is unobtrusive to the driver or vehicle owner.

As an example of the many possible applications of embodiments described herein, the ability to identify and update the available gear ratios for a given truck configuration is useful for predictive shifting, or for shifting in general. Knowing the available gear ratios allows a calculation of the resulting maximum torque available after a gear change, which can then be used to predict if the vehicle will be able to maintain its current speed, increase speed, or lose speed as a result of a shift. Such shifting information can be pre-programmed for a particular transmission or truck model and made available to a transmission controller in a static manner. However, using embodiments described herein, it is possible to provide dynamically measured and updated information regarding the advisability of a shift without relying on pre-programmed gear ratio data.

As another example of the many possible applications of embodiments described herein, a predictive cruise control system may use mappings of estimated driveline ratios to perform tasks such as estimating drag forces when coasting in gear, estimating vehicle acceleration, or optimizing cruise control response (gain scheduling) as a function of the current gear ratio to improve fuel economy. As another example, a manual transmission vehicle having no sensors for detecting a current gear may use described embodiments to determine and display a current gear by comparing an estimated current driveline ratio to a mapping of known gears and driveline ratios. As another example, a vehicle may use described embodiments to select an efficient gear for a specific purpose and/or based on information about upcoming terrain (e.g., selecting a gear for descending a hill). Engine retarder equipment on heavy duty trucks has an efficiency curve. In one illustrative scenario, a truck uses estimated driveline ratios to calculate and compare deceleration in gears above and below a current gear in order to select a proper gear for descending a hill. This can help to make a more accurate selection of a gear for maintaining a constant speed when descending a steep grade. As another example, once a mapping of transmission gears and driveline ratios is established, a vehicle can use the ratios stored therein to improve identification of driveline engagement where other sensors or techniques for doing so are not available.

Illustrative Operating Environment

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. A controller area network (CAN) bus as specified by the Society of Automotive Engineers (SAE) J1939 standard can be used to communicate vehicle operating conditions and other information. However, as innovations in vehicle network communications continue, it is to be understood that other bus and network designs or communication protocols also can be used within the scope of the present disclosure.

FIG. 1 is a block diagram that illustrates an embodiment of a vehicle computer system including a driveline ratio analysis system 100 in which described embodiments may be implemented. In an illustrative scenario, the system 100 is implemented in a vehicle having a powertrain comprising an engine connected to a transmission (e.g., an automatic transmission, an automated manual transmission, or a manual transmission) having a number of gears. The transmission is connected to one or more drive wheels or a similar traction device.

In the example shown in FIG. 1, the system 100 includes one or more processing units (e.g., electronic control units (ECUs)) 106 that calculate, analyze, and store estimated driveline ratios as described herein. It should be understood that processing units that may be considered part of the driveline ratio analysis system 100 for the purposes of this description need not be limited to the functionality described herein, and may also be used for other purposes within the vehicle computer system.

The processing units 106 are communicatively coupled to one or more data stores 104, which may include data such as vehicle operation data and vehicle configuration data. The data store 104 includes a computer-readable storage medium. Any suitable computer-readable storage medium, such as an EEPROM, flash memory, hard disk, or the like may be used. The data is used by the system 100, as described herein, to perform one or more of the functions described herein. For example, the description makes reference to driveline ratios and related information that can be calculated, processed, and stored during vehicle operation.

It will be appreciated that the processing units 106 can be implemented in a variety of hardware, software, and combination hardware/software configurations, for carrying out aspects of the present disclosure. The processing units 106 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor. The memory may include program instructions that implement functionality of the system 100. Alternatively, such instructions may be stored in other storage or in other locations.

In the example shown in FIG. 1, the system 100 is communicatively coupled to a plurality of modules that provide information concerning the status of the vehicle. For example, the system 100 may be communicatively coupled to a vehicle speed sensor module 110, an engine speed sensor module 112, a driveline engagement detection module 114, or other modules. Modules for sensing engine speed, sensing vehicle speed, and detecting driveline engagement are known in the art. The driveline engagement detection module may include a neutral position sensor, a clutch switch, or some other sensor, circuitry, or logic for detecting whether the truck's driveline is engaged (that is, whether the truck is in gear).

Specific examples of how data received from modules such as the vehicle speed sensor module 110, the engine speed sensor module 112, and the driveline engagement detection module 114 may be used are described in detail below in the context of illustrative embodiments. The sensor modules and other modules described herein for providing information about the status of the vehicle are only examples, and the present disclosure is not limited the specific sensor modules described herein.

The system 100 is also communicatively coupled to a plurality of vehicle performance control modules 120A-120N for controlling various functions of the vehicle. For example, the system 100 may be communicatively coupled to modules that electronically control vehicle speed, engine speed, or other more specialized functions such as cruise control or predictive cruise control. The vehicle performance control modules described herein are only examples, and the present disclosure is not limited to the specific vehicle performance control modules described herein.

Components described herein may be communicatively coupled by any suitable means. In one embodiment, components may be connected by an internal communications network such as a vehicle bus that uses a CAN protocol, a local interconnect network (LIN) protocol, and/or the like. Those of ordinary skill in the art will recognize that the vehicle bus may be implemented using any number of different communication protocols such as, but not limited to, SAE J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed communication systems without departing from the scope of the claimed subject matter.

The system 100 may be implemented in an on-board vehicle computer system or in some other configuration. Although some examples described herein relate to on-board vehicle computer systems, such examples may be extended to involve computer systems that are not on board a vehicle. For example, a suitably equipped vehicle may communicate with other computer systems wirelessly, e.g., via a WiFi or cellular network. Such systems may provide remote data processing and storage services, remote diagnostics services, driver training or assistance, or other services. In such an embodiment, the system 100 may be implemented in one or more computing devices that communicate with but are separate from, and potentially at a great distance from the vehicle.

As shown, the system 100 communicates with an operator interface 108 comprising a display 102. The display 102 may be any type of display used in a vehicle to convey information (e.g., a current gear, current engine speed, current vehicle speed, cruise control settings, or other information or notifications) to the operator. For example, the display 102 may include an LCD display configured to display information to the operator. The display 102 also may provide other information related to the operator, or the truck or its environment. The operator display 102 may include special purpose lighted displays, needle gauges, and/or the like. The operator interface 108 also may include other output devices such as speakers or haptic feedback devices to provide information to the operator. In a touch-screen configuration, the operator display 102 may have input capabilities. The operator interface 108 also may include other input devices including buttons, toggles, keyboards, mechanical levers, and any other devices that allow an operator to provide input to the system 100 or other systems of the vehicle.

In operation, the system 100 tracks and filters estimated driveline ratios over time to produce and update a list or mapping of estimated driveline ratios for existing transmission gears. The ways in which the list or mapping can be produced and updated include the following three examples. First, the system can detect and add new ratios to the mapping. In at least one embodiment, a new ratio is added to the mapping when it does not fall within a specified range of any previously stored ratios. Second, the system can use estimated ratios that do fall within a specified range of an existing ratio as additional samples to update and improve the accuracy of the existing ratio. Third, the system can remove duplicates. In at least one embodiment, the system creates a single ratio from combined data of multiple existing ratios if the existing ratios begin to merge. Estimated ratios and related mappings to transmission gears can be stored in non-volatile memory between drive cycles. Although such storage is not necessary in all situations, it can improve accuracy during short drives and can be useful for features such as predictive cruise control that may be used early in a drive cycle before an accurate mapping of ratios can be constructed. These examples are described in greater detail below with reference to FIGS. 2-5B.

Figure 2:
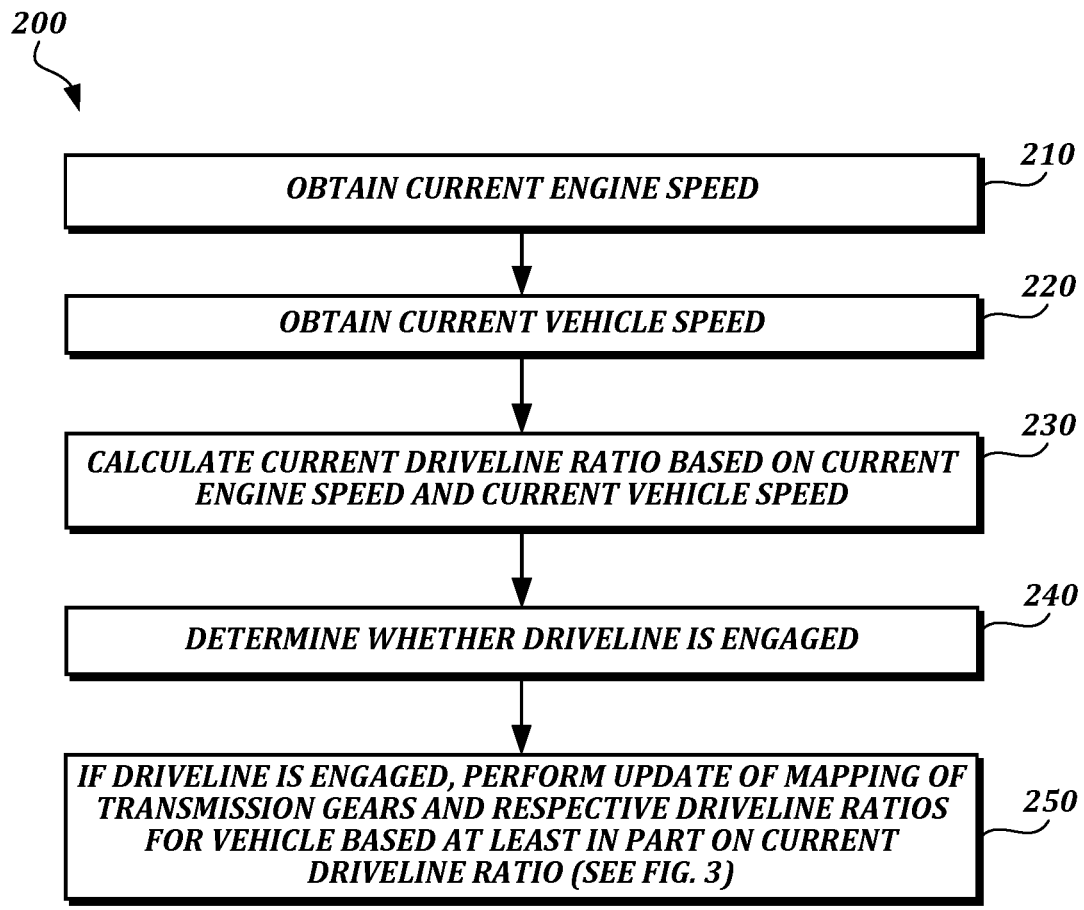
FIGS. 2 and 3 are flow diagrams of illustrative processes that may be performed by a driveline ratio analysis system to update a mapping of transmission gears and respective driveline ratios in accordance with aspects of the present disclosure.
Figure 3:
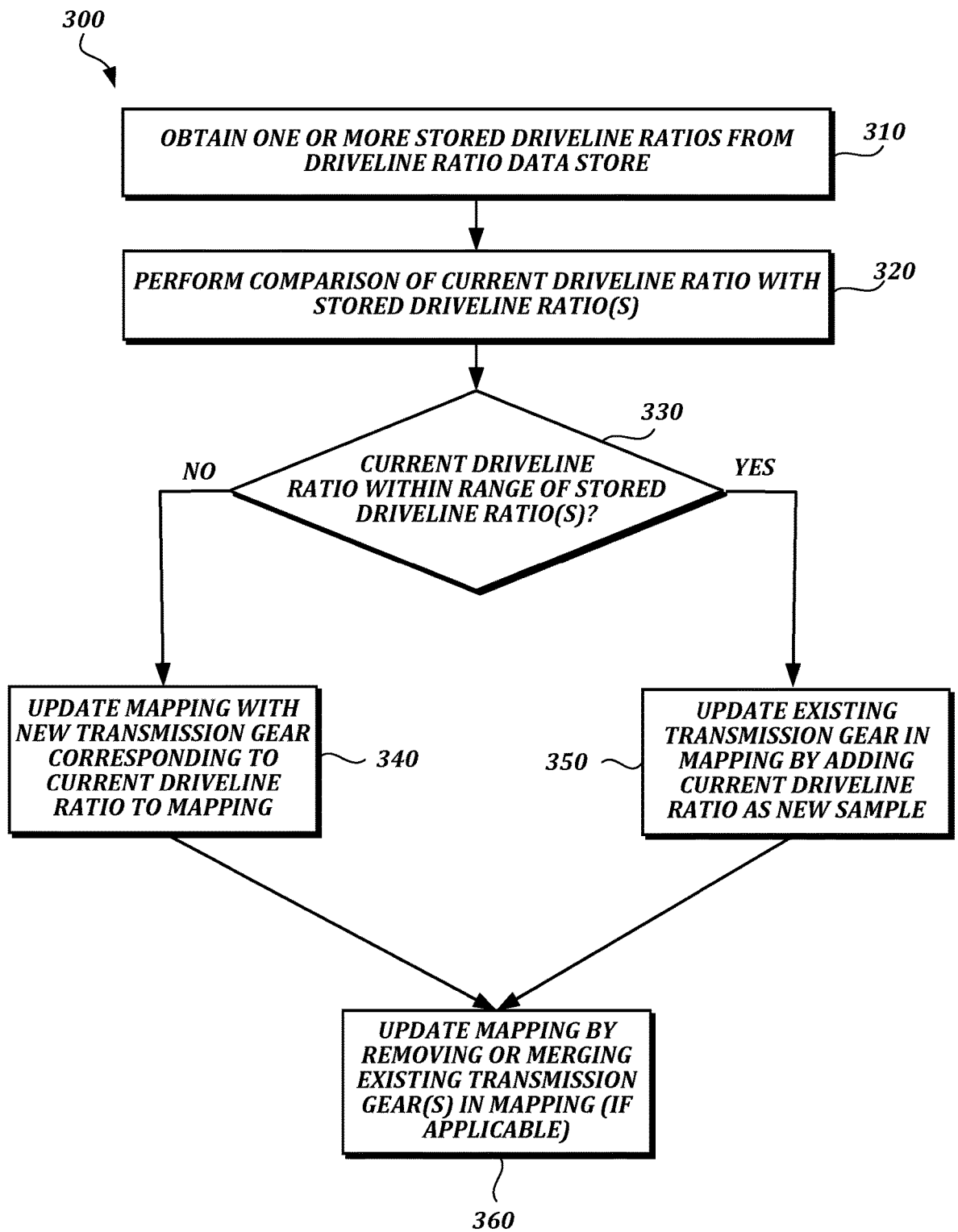

FIGS. 2 and 3 are flow diagrams of illustrative processes 200, 300 that may be performed to create or update a mapping of transmission gears and respective driveline ratios, in accordance with aspects of the present disclosure. The processes 200, 300 may be performed by the driveline ratio analysis system 100 described above or by some other system.

Referring to FIG. 2, at step 210 the system obtains a current engine speed for a vehicle, and at step 220 the system obtains a current vehicle speed for the vehicle. At step 230, the system uses the current engine speed and the current vehicle speed to calculate a current driveline ratio. In at least one embodiment, the driveline ratio is calculated as the number of engine rotations divided by the number of tire rotations. This calculation can be translated as (Engine Rotations)*(1/(Vehicle Speed))*(Tire Radius). To obtain the appropriate ratio, Engine Rotations is measured in radians/second, Vehicle Speed is measured in meters/second, and tire radius is measured in meters/radian. In this way, the units cancel and a unit-free driveline ratio is calculated based on engine speed, vehicle speed, and tire size. Alternatively, other calculations may be used.

At step 240, the system determines whether the driveline is engaged. For example, the system may receive a corresponding signal from a driveline engagement detection module, which may include a neutral position sensor, a clutch switch, or some other sensor, circuitry, or logic for detecting whether the truck's driveline is engaged (that is, whether the truck is in gear). At step 250, if the driveline is engaged, the system performs an update of a mapping of transmission gears and respective driveline ratios for the vehicle, based at least in part on the current driveline ratio.

Some examples of how such an update may be carried out are now described with reference to FIG. 3. At step 310, the system obtains one or more stored driveline ratios from a driveline ratio data store. At step 320, the system compares the current driveline ratio with the one or more stored driveline ratios. In the example shown in FIG. 3, the comparison involves determining, at step 330, whether the current driveline ratio is within a range (e.g., error bounds) of a stored driveline ratio. If the current driveline ratio is not within the range, the system updates the mapping with a new transmission gear and associates the current driveline ratio with the new gear at step 340. If the current driveline ratio is within the range, at step 350 the system updates an existing transmission gear in the mapping by adding the current driveline ratio as a new sample for the existing transmission gear. This can help to more accurately reflect the driveline ratios associated with the existing gear. The system may also determine whether any transmission gears should be considered duplicates of one another, or whether multiple transmission gears should be merged into a single transmission gear in the mapping. If gears are to be removed from or merged in the mapping, at step 360 the system updates the mapping accordingly. Detailed examples of how these updates may be carried out are provided below.

Figure 4:
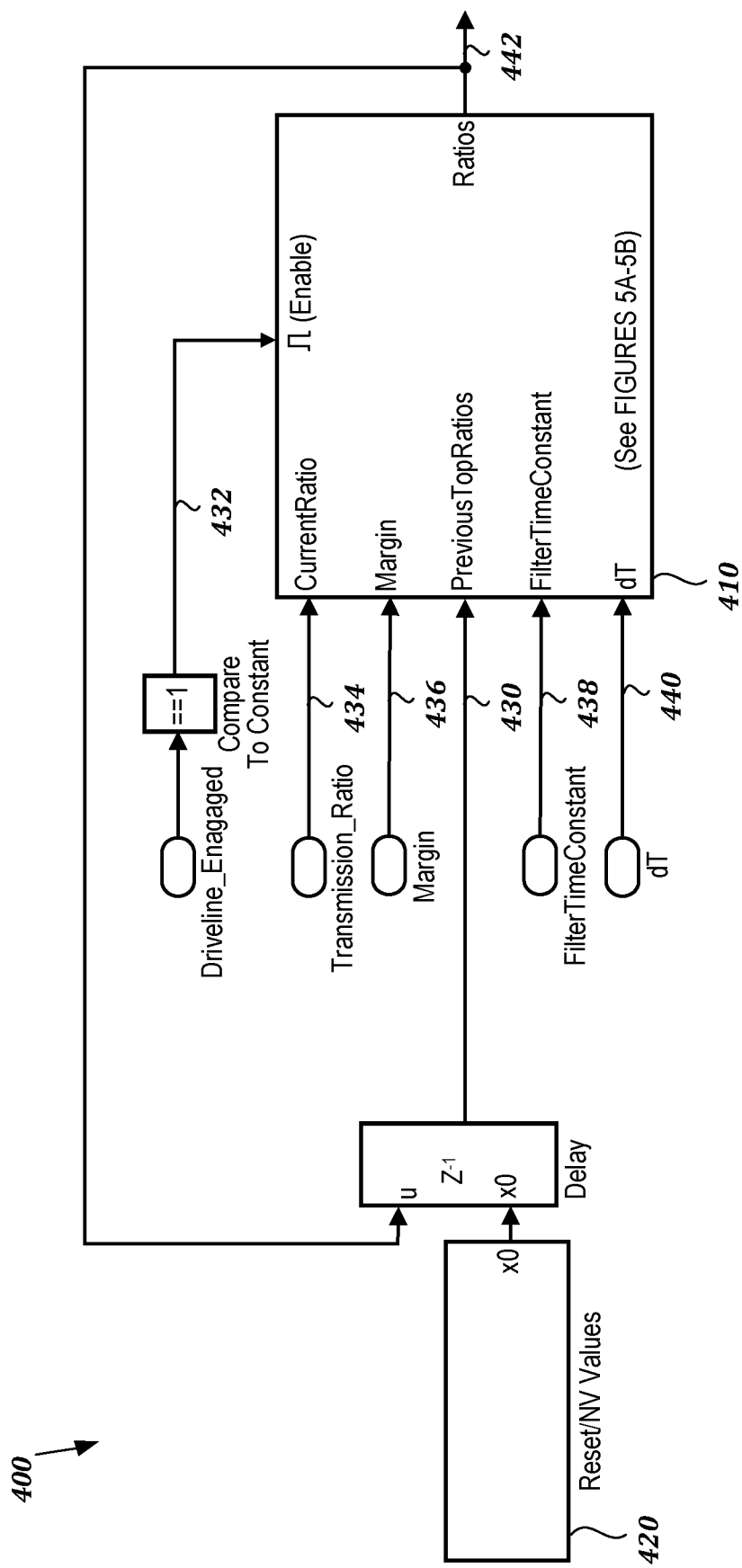
FIG. 4 is a logic diagram depicting illustrative logic that may be implemented in a driveline ratio analysis system to implement the illustrative processes of FIGS. 2 and 3, or other processes, in accordance with aspects of the present disclosure.
Figure 6A:
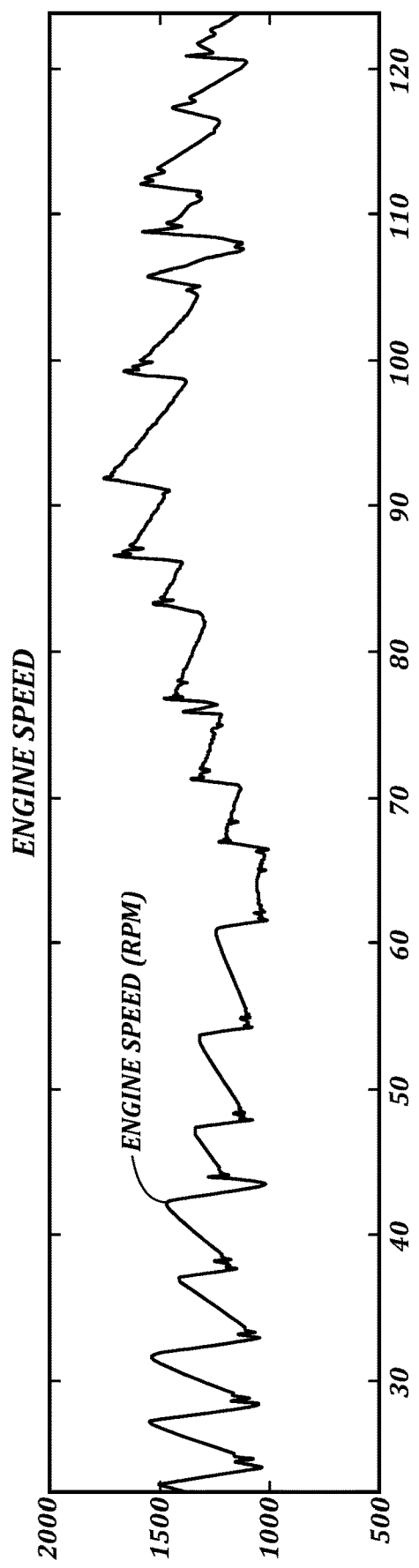
FIGS. 6A, 6B, 6C, and 6D are graphs depicting illustrative changes in engine speed, vehicle speed, calculated driveline ratio, and driveline engagement, respectively.
Figure 6B:
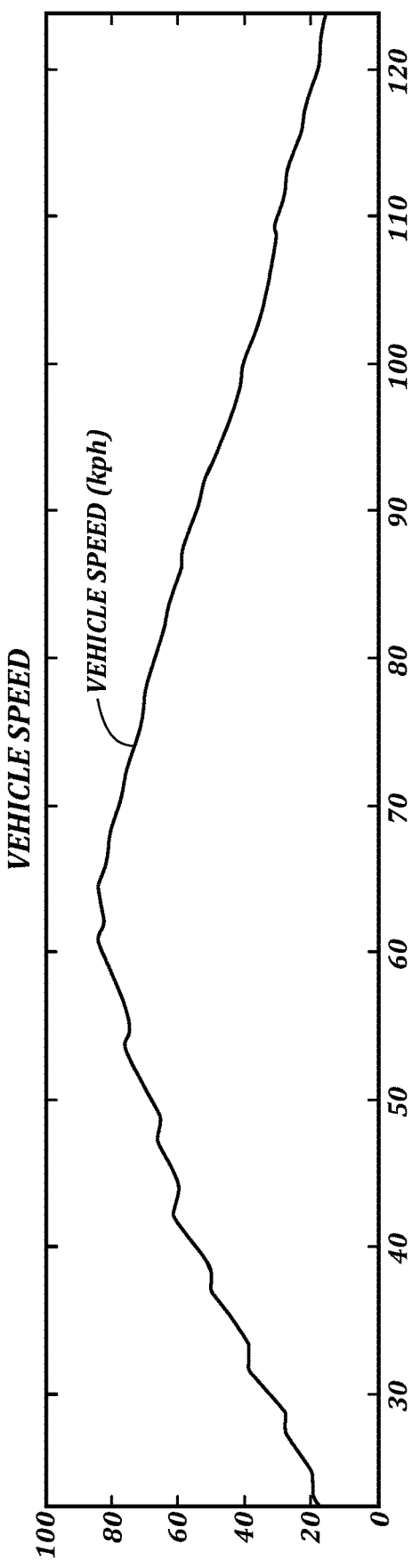
Figure 6C:
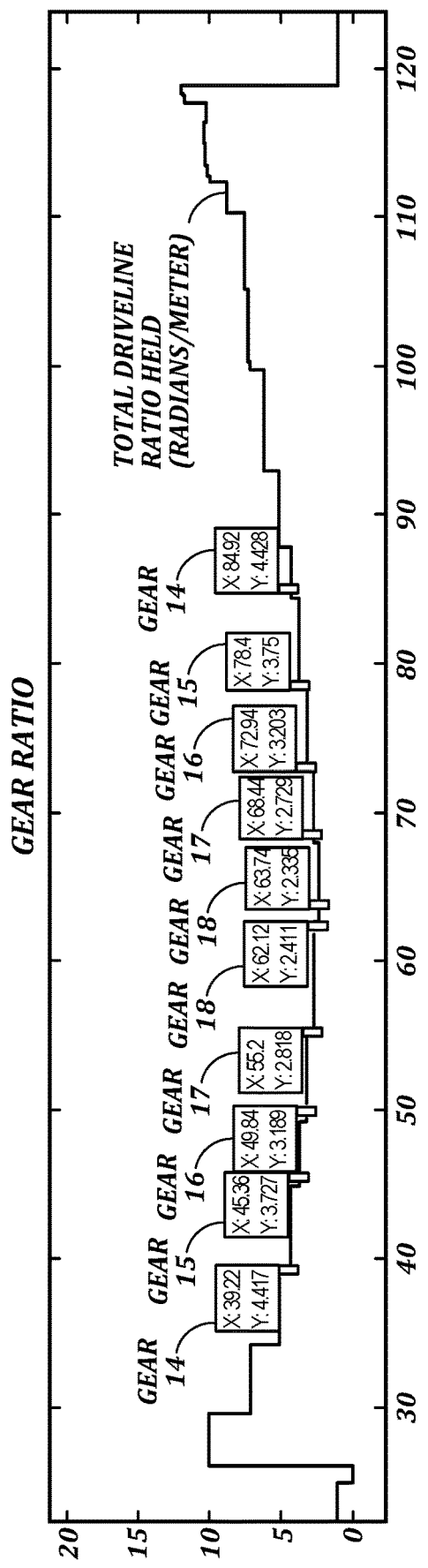
Figure 6D:
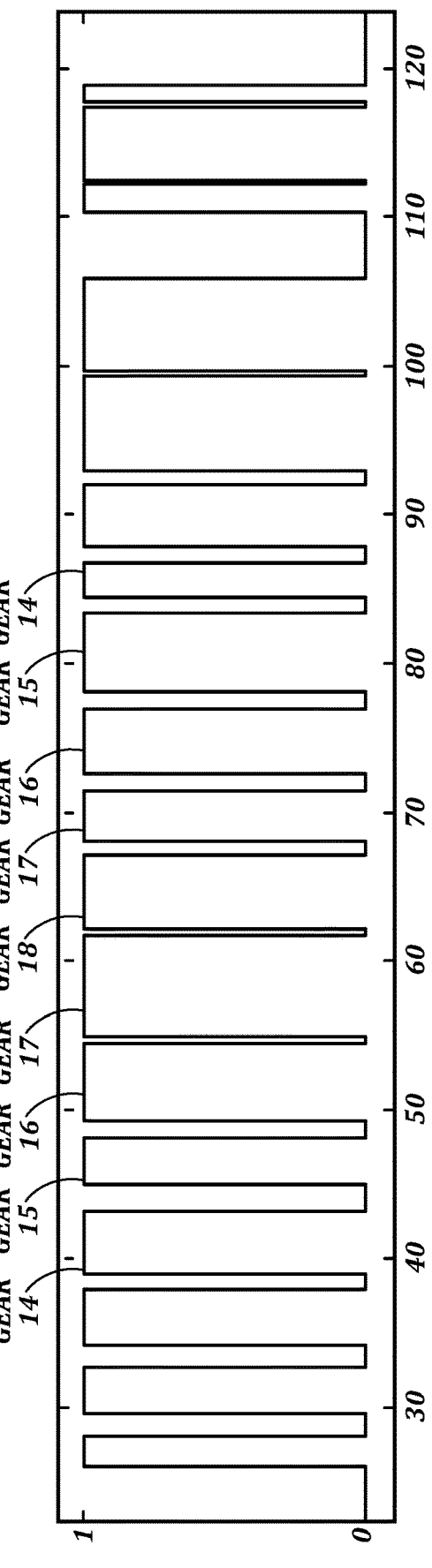

FIG. 4 is a logic diagram depicting illustrative logic 400 that may be implemented in the illustrative driveline ratio analysis system 100 of FIG. 1 (e.g., in one or more ECUs or other processing units) to implement the illustrative processes described above, or other processes.

In the example shown in FIG. 4, the logic 400 includes a driveline ratio analysis function 410 (which also may be referred to as a ratio logger or gear memorization function) that receives stored driveline ratios (e.g., "PreviousTopRatios" signal 430) from storage 420 along with signals that provide vehicle operation information. The vehicle operation information may include an indication of whether the driveline is engaged (e.g., Driveline_Engaged signal 432) and a current driveline ratio (e.g., Transmission_Ratio signal 434). The logic 400 also generates signals. In the example shown in FIG. 4, the logic 400 provides an output signal in the form of updated driveline ratio mapping information (e.g., Ratios signal 442).

The vehicle operation information may be received from modules such as a vehicle speed sensor module, an engine speed sensor module, and a driveline engagement detection module (see FIG. 1). The system configuration information may include configurable parameters such as a margin value for calculating upper and lower margins for stored gears (e.g., Margin signal 436). The system configuration information also may include parameters for filtering calculated driveline ratios. For example, to calculate low-pass filter coefficients, the parameters may include a filter time constant (e.g., FilterTimeConstant signal 438) and a time value (e.g., dT signal 440). The system configuration information may be received from a service tool connected to an on-board vehicle computer system via a CAN bus (not shown), or in some other way, such as from a remote computer communicating wirelessly with the system 100. Vehicle operation information and system configuration information may be stored in one or more data stores within or outside of the system 100.

Details of the driveline ratio analysis (or gear memorization) function are now described with reference to the illustrative code shown in FIGS. 5A and 5B. In the example shown in FIGS. 5A and 5B, the GearMemorization function calculates and filters ratios based on the following parameters: CurrentRatio, PreviousTopRatios, Margin, FilterTimeConstant, and dT. After initialization, the GearMemorization function calculates a low-pass filter coefficient, defines upper and lower margins for each stored gear (based on the Margin parameter), and compares the current driveline ratio (CurrentRatio) with stored driveline ratios (PreviousTopRatios). In this example, the comparison involves determining whether the current driveline ratio is below, above, or within the margins of the current gear. In the example, if CurrentRatio is above the upper margin of the current gear and below the lower margin of the previous gear), the GearMemorization function adds a new gear above the current gear and below the previous gear. If CurrentRatio is within the upper and lower margins of the current gear, the GearMemorization function adds a new sample to the current gear. Otherwise, the function moves on to the next gear and performs similar comparisons to determine what to do with the current driveline ratio. In this way, the GearMemorization function finds an appropriate existing gear, or creates a new gear for the current driveline ratio. Afterward, the GearMemorization function determines whether any duplicate gears can be removed from the mapping and outputs the updated set of driveline ratios.

Many alternatives to the logic depicted in FIG. 4 and the processing described with reference to FIGS. 2, 3, 5A and 5B are possible. For example, although a low-pass filter coefficient is calculated and used in this example for the purpose of adding samples to existing gears, the use of the low-pass filter coefficient and the particular calculation of the low-pass filter coefficient are not required. Other techniques may be used for updating the driveline ratios for existing gears, such as by using a different calculation for the coefficient, or by omitting the use of the coefficient and using simple averaging of a current ratio and an existing ratio.

Experimental Results

Figure 7:
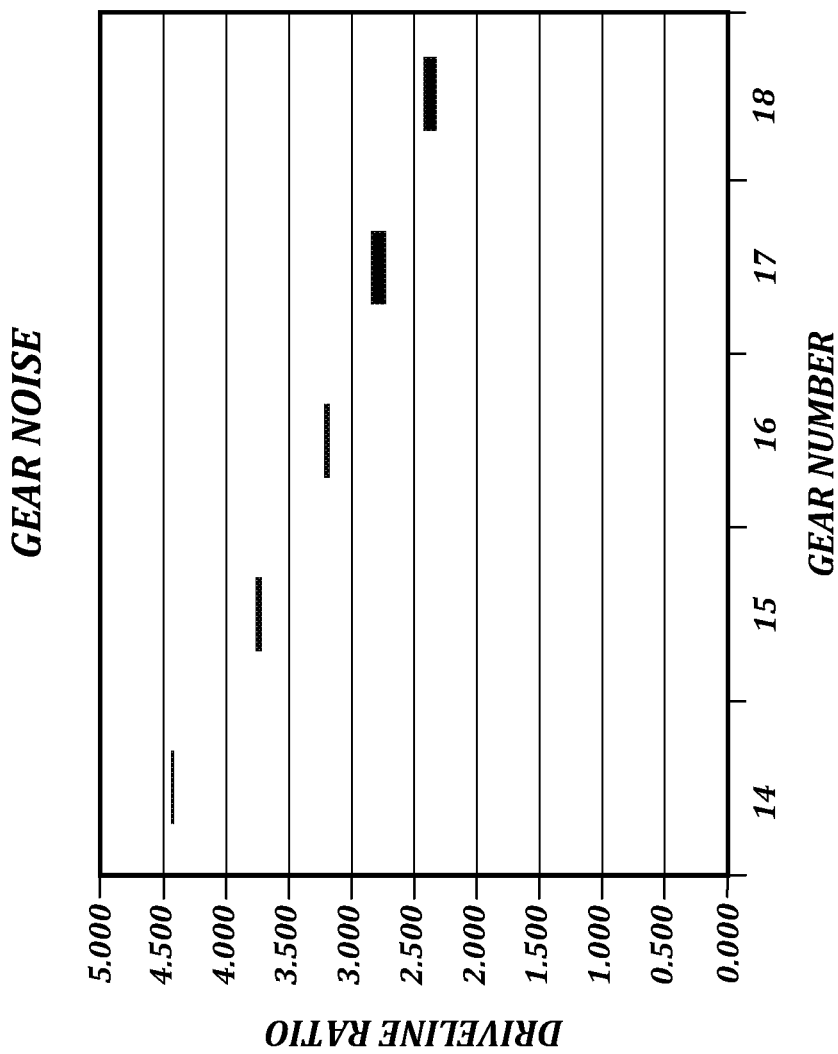
FIG. 7 is a graph depicting variation in calculated driveline ratios for respective transmission gears.

Experimental results for the illustrative driveline ratio analysis system are now described with reference to FIGS. 6A-10. FIGS. 6A, 6B, 6C, and 6D are graphs depicting changes in engine speed, vehicle speed, calculated driveline ratio, and driveline engagement, respectively, over a time period (approximately 120 seconds) as a vehicle accelerates and then slows down. Driveline ratios are calculated based on engine speed and vehicle speed when the driveline is engaged (driveline engaged value=1). In the example shown in FIG. 6C, maximum and minimum calculated driveline ratios are shown as Y values for each of gears 14 to 18. (The "radians/meter" notation in this graph is indicative of the use of radians/second to measure engine speed and meters/second to measure vehicle speed, as explained above.) The variation in the calculated ratios represents gear ratio noise (e.g., due to driveline backlash and sensor resolution), as depicted in FIG. 7, with gear 17 being the noisiest (greatest difference between calculated ratios) of this group. However, FIG. 7 also shows that, despite the signal noise, the calculated driveline ratios did not overlap with one another for these gears.

Figure 8:
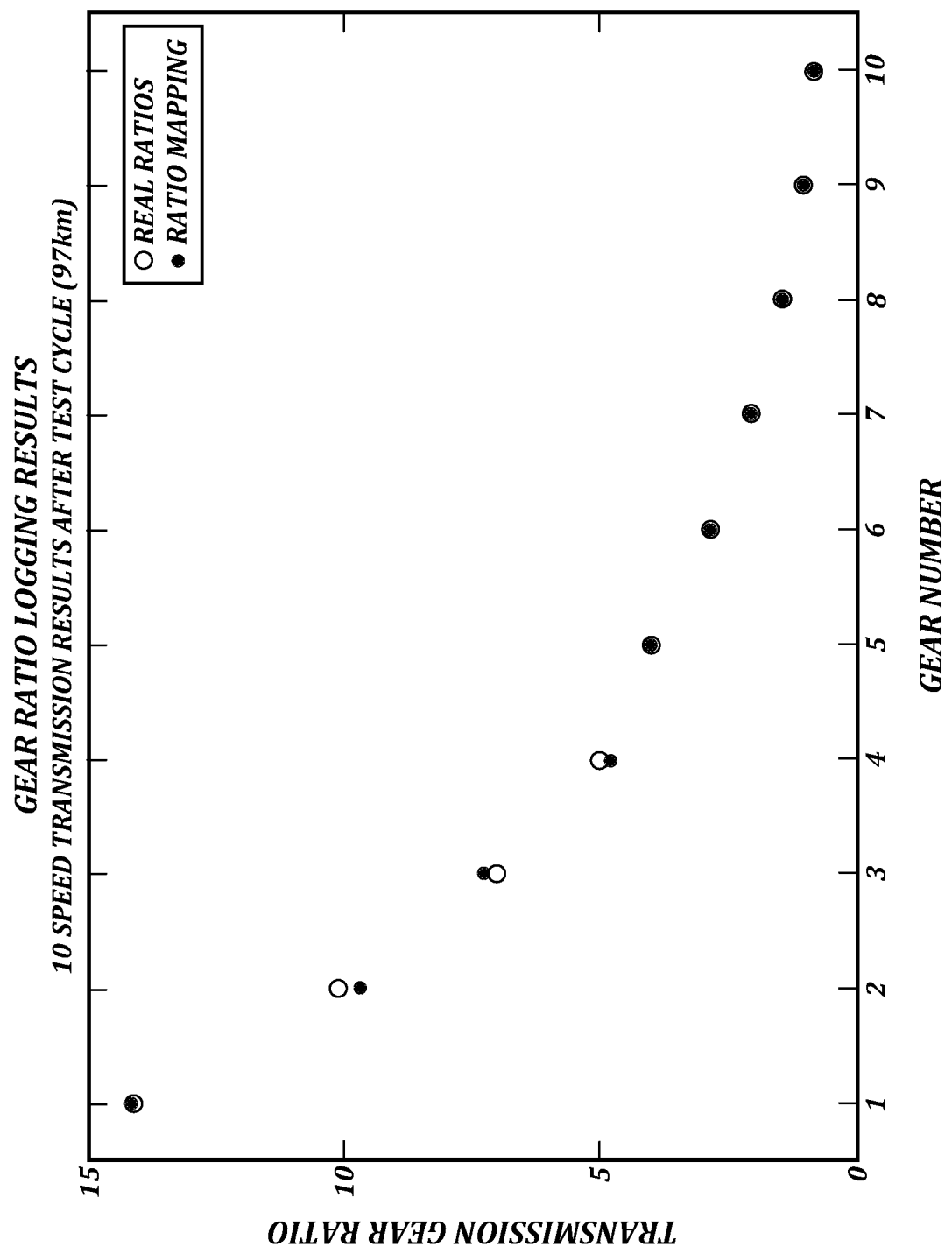
FIGS. 8-10 are graphs showing test results that demonstrate overall accuracy of estimated driveline ratios that are calculated in accordance with aspects of the present disclosure.
Figure 9:
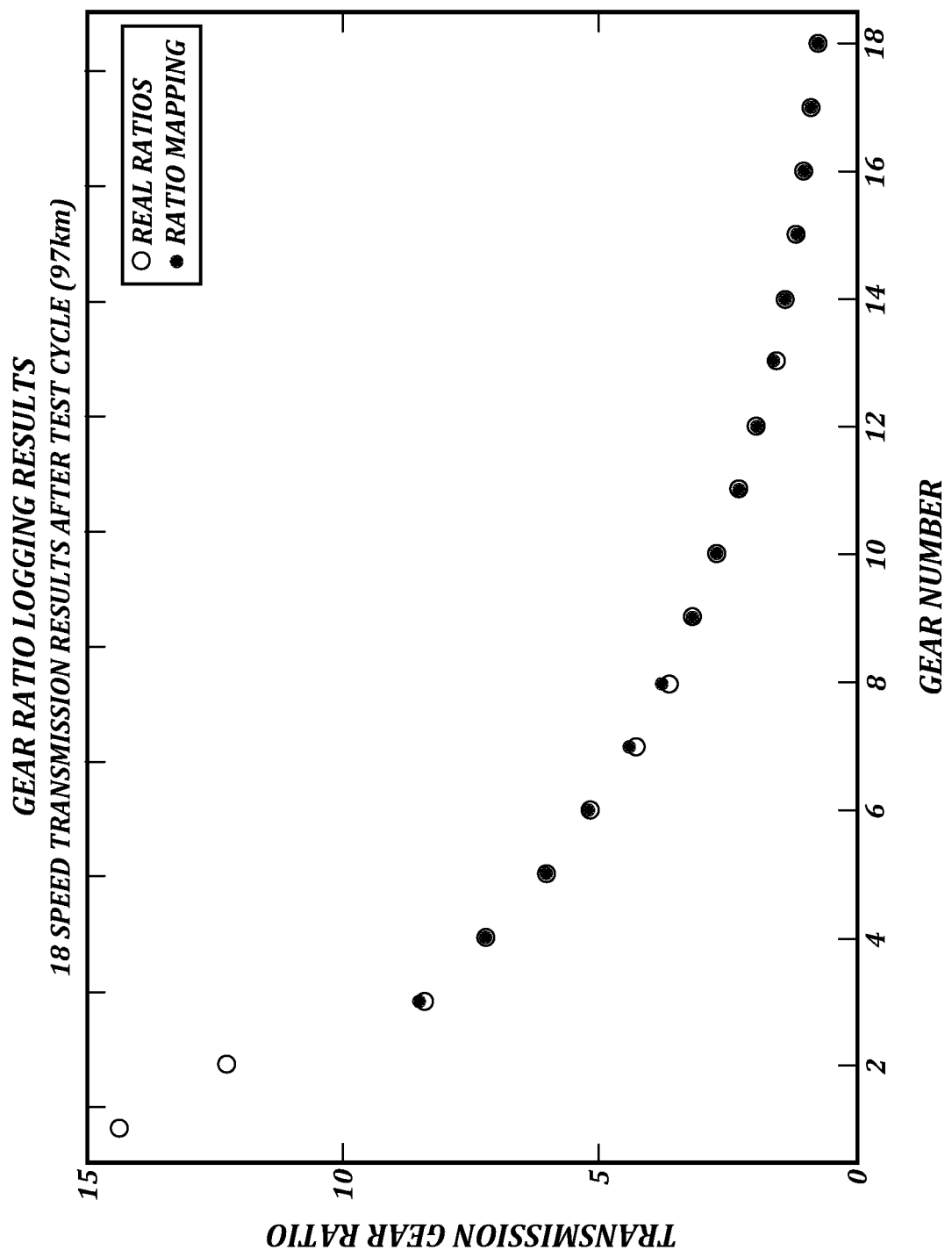
Figure 10:
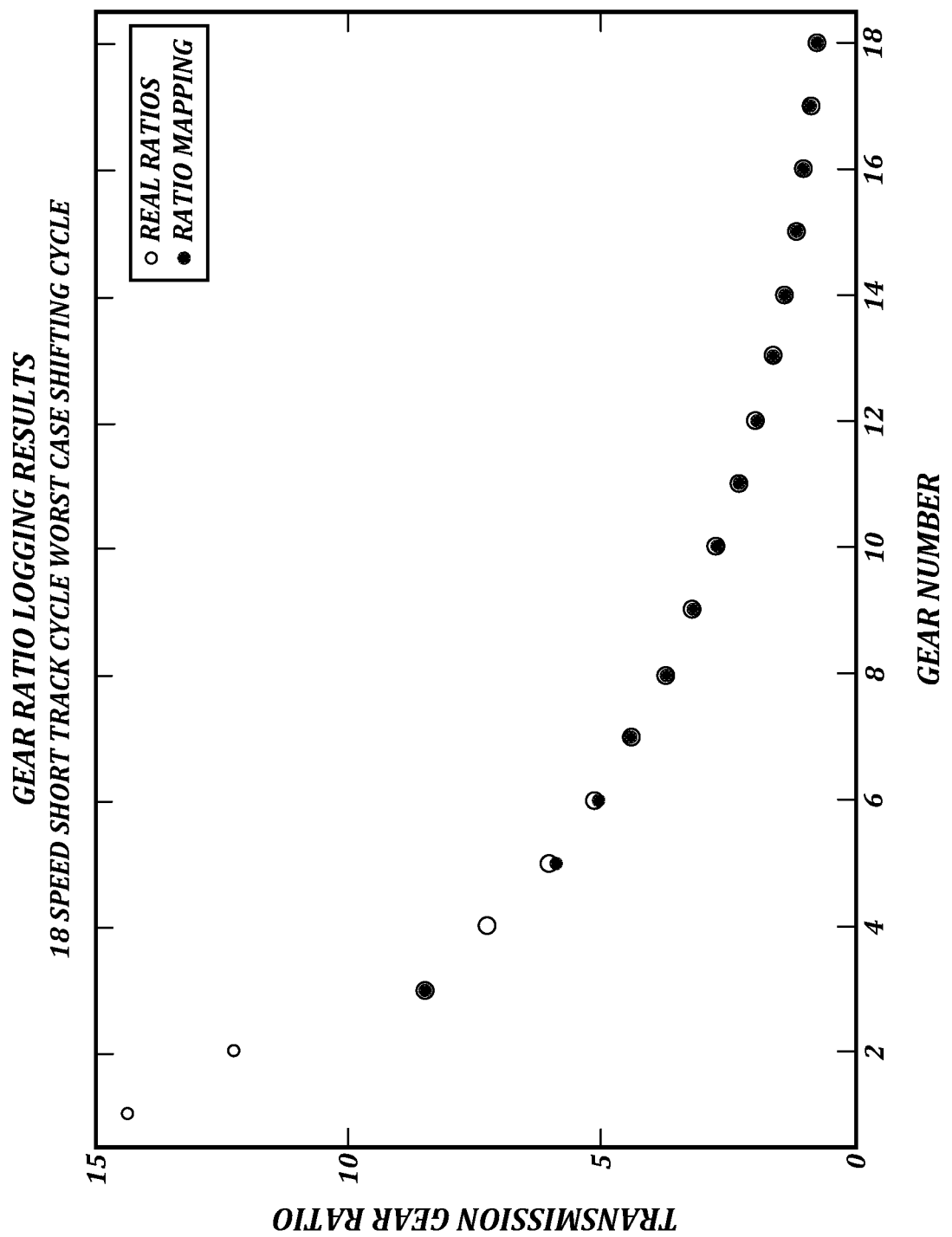

FIGS. 8-10 are graphs showing test results that demonstrate overall accuracy of calculated driveline ratios compared to actual driveline ratios for respective transmission gears. Specifically, FIGS. 8 and 9 show road-test results for 10-gear and 18-gear transmissions, respectively, and FIG. 10 shows track-test results for an 18-gear transmission. Gears 1 ("Lo-Lo") and 2 ("Lo-Hi") were not used in the tests depicted in FIGS. 9 and 10, so no driveline ratios were calculated for gears 1 and 2 in those tests. In addition, gear 4 ("1-Hi") was always skipped in the test depicted in FIG. 10, so no driveline ratio was calculated for gear 4 in that test.

Lab testing was used to track the accuracy of calculated ratios over time. In one case, a vehicle was tested with an actual top-gear driveline ratio of 2.22 (driveline ratio 2.22) =transmission ratio (0.796)*axle ratio (2.79)). In testing, an estimated top-gear driveline ratio was calculated, with the estimates having a minimum value of 2.17 (0.05 difference from actual) and a maximum value of 2.20 (0.02 difference). These results demonstrate a low percentage of error for both the minimum value (0.05/2.22*100=2.25%) and the maximum value (0.02/2.22*100=0.90%).

Extensions and Alternatives

Many alternatives to the described methods are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the vehicles and systems described herein are possible. Although illustrative details of vehicle computing systems are described with reference to FIG. 1, it should be understood that alternative systems and methods can be implemented and used in accordance with the present disclosure. Further, it should be understood that, in practice, a fully-functional vehicle computer system may have additional components (e.g., sensors, control modules, output devices, input devices, and the like) that are not shown in FIG. 1 for ease of illustration.

The particular signals, variables, and parameters described herein, as well as their respective possible ranges and states and the particular logic for processing them, are only examples. Depending on implementation, more or fewer or different signals, variables, and parameters may be used to achieve similar results. In any of the examples described herein, the specific signals, variables, and parameters that are described can be separated into additional signals, variables, or parameters, or combined into fewer signals, variables, or parameters.

It should be understood that aspects of the systems and related processes described herein transcend any particular type of vehicle and may be applied to vehicles employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A vehicle computer system comprising:
  at least one processing unit; and
  one or more computer-readable media having stored therein a driveline ratio data store for a vehicle and computer-executable instructions, wherein the driveline ratio data store comprises a mapping of transmission gears and respective driveline ratios for the vehicle, and wherein the computer-executable instructions are configured to cause the vehicle computer system to:
    obtain a current engine speed for the vehicle;
    obtain a current vehicle speed for the vehicle;
    calculate a current driveline ratio for the vehicle based on the current engine speed and the current vehicle speed;
    determine whether a driveline of the vehicle is engaged;
    if the driveline of the vehicle is engaged, perform an update of the mapping of transmission gears and respective driveline ratios for the vehicle based at least in part on the current driveline ratio; and
    cause the vehicle computer system to use the updated mapping to select a gear.

2. The vehicle computer system of claim 1, wherein performing the update includes:
  obtaining one or more stored driveline ratios from the driveline ratio data store; and
  comparing the current driveline ratio with the one or more stored driveline ratios.

3. The vehicle computer system of claim 2, wherein performing the update further includes, based on the comparing, adding a new transmission gear to the mapping or updating an existing transmission gear in the mapping.

4. The vehicle computer system of claim 3, wherein the comparing comprises determining that the current driveline ratio is not within error bounds of any of the one or more stored driveline ratios, wherein performing the update comprises adding the new transmission gear to the mapping, and wherein adding the new transmission gear comprises adding the current driveline ratio to the mapping for the new transmission gear.

5. The vehicle computer system of claim 3, wherein the comparing comprises determining that the current driveline ratio is within error bounds of at least one of the stored driveline ratios associated with at least one existing transmission gear in the mapping, and wherein updating the existing transmission gear comprises adding the current driveline ratio as a new sample for the at least one existing transmission gear in the mapping.

6. The vehicle computer system of claim 1, wherein performing the update further includes removing a duplicate transmission gear from the mapping or merging two or more existing transmission gears in the mapping.

7. The vehicle computer system of claim 1, wherein the computer-executable instructions are further configured to cause the vehicle computer system to use the updated mapping in a cruise control system or a predictive cruise control system.

8. The vehicle computer system of claim 1, wherein the vehicle computer system is an on-board vehicle computer system.

9. The vehicle computer system of claim 1, wherein whether the driveline of the vehicle is engaged is determined using a clutch switch.

10. A computer-implemented method performed by a computer system comprising one or more processing units, the method comprising:
  obtaining a current engine speed for a vehicle;
  obtaining a current vehicle speed for the vehicle;
  calculating a current driveline ratio for the vehicle based on the current engine speed and the current vehicle speed;
  determining whether a driveline of the vehicle is engaged;
  when the driveline of the vehicle is engaged, performing an update of a mapping of transmission gears and respective driveline ratios for the vehicle based at least in part on the current driveline ratio; and
  using the updated mapping to select a gear.

11. The method of claim 10, wherein performing the update includes:
  obtaining one or more stored driveline ratios from the driveline ratio data store; and
  comparing the current driveline ratio with the one or more stored driveline ratios.

12. The method of claim 11, wherein performing the update further includes, based on the comparing, adding a new transmission gear to the mapping or updating an existing transmission gear in the mapping.

13. The method of claim 12, wherein the comparing comprises determining that the current driveline ratio is not within error bounds of any of the one or more stored driveline ratios, and wherein adding the new transmission gear comprises adding the current driveline ratio to the mapping for the new transmission gear.

14. The method of claim 12, wherein the comparing comprises determining that the current driveline ratio is within error bounds of at least one of the stored driveline ratios associated with at least one existing transmission gear in the mapping, and wherein updating the existing transmission gear comprises adding the current driveline ratio as a new sample for the at least one existing transmission gear in the mapping.

15. The method of claim 10, wherein performing the update further includes removing a duplicate transmission gear from the mapping or merging two or more existing transmission gears in the mapping.

16. The method of claim 10, further comprising using the updated mapping in a cruise control system or a predictive cruise control system.

17. The method of claim 10, wherein the computer system is an on-board vehicle computer system.

18. The method of claim 10, wherein whether the driveline of the vehicle is engaged is determined using a clutch switch.

19. A non-transitory computer-readable medium having computer-executable instructions stored thereon that, in response to execution by one or more processors of a computer system, cause the computer system to perform actions comprising:
  obtain a current engine speed for a vehicle;
  obtain a current vehicle speed for the vehicle;
  calculate a current driveline ratio for the vehicle based on the current engine speed and the current vehicle speed;
  determine whether a driveline of the vehicle is engaged;
  when the driveline of the vehicle is engaged, perform an update of a mapping of transmission gears and respective driveline ratios for the vehicle based at least in part on the current driveline ratio; and
  use the updated mapping to select a gear.

20. The non-transitory computer-readable medium of claim 19, wherein the computer system is an on-board vehicle computer system.

21. A vehicle comprising:
  a powertrain comprising an engine connected to a transmission, the transmission having a number of gears;
  at least one processing unit; and
  one or more computer-readable media having stored therein a driveline ratio data store for the vehicle and computer-executable instructions, wherein the driveline ratio data store comprises a mapping of the transmission gears and respective driveline ratios for the vehicle, and wherein the computer-executable instructions are configured to cause the at least one processing unit to:
    obtain a current engine speed for the engine;
    obtain a current vehicle speed for the vehicle;
    calculate a current driveline ratio for the vehicle based on the current engine speed and the current vehicle speed;
    determine whether a driveline of the vehicle is engaged;
    when the driveline of the vehicle is engaged, perform an update of the mapping of transmission gears and respective driveline ratios for the vehicle based at least in part on the current driveline ratio; and
    use the updated mapping to select a gear.

* * * * *